(12) United States Patent
Devadiga et al.

(10) Patent No.: US 12,393,813 B2
(45) Date of Patent: Aug. 19, 2025

(54) DUAL INTERFACE SMART CARD WITH METAL FACE LAYER AND MANUFACTURING METHOD THEREOF

(71) Applicant: MCT CARDS & TECHNOLOGY PRIVATE LIMITED, Karnataka (IN)

(72) Inventors: Shrikanth N. Devadiga, Karnataka (IN); Sushir Rao, Karnataka (IN); Nishanth N. Shet, Karnataka (IN); Nagabhushan S. Bhat, Karnataka (IN); Sudhish S. Rao, Karnataka (IN); Abhay Gupte, Karnataka (IN)

(73) Assignee: MCT CARDS & TECHNOLOGY PRIVATE LIMITED (IN)

( * ) Notice: Subject to any disclaimer, the term of this patent is extended or adjusted under 35 U.S.C. 154(b) by 0 days.

(21) Appl. No.: 18/289,487

(22) PCT Filed: Jul. 21, 2022

(86) PCT No.: PCT/IB2022/056762
§ 371 (c)(1),
(2) Date: Nov. 3, 2023

(87) PCT Pub. No.: WO2023/131825
PCT Pub. Date: Jul. 13, 2023

(65) Prior Publication Data
US 2024/0242055 A1 Jul. 18, 2024

(30) Foreign Application Priority Data
Jan. 4, 2022 (IN) .............................. 202241000462

(51) Int. Cl.
G06K 19/077 (2006.01)
B32B 9/04 (2006.01)
B32B 37/12 (2006.01)

(52) U.S. Cl.
CPC ........ *G06K 19/07722* (2013.01); *B32B 9/041* (2013.01); *B32B 37/1207* (2013.01); *B32B 2309/12* (2013.01); *B32B 2425/00* (2013.01)

(58) Field of Classification Search
CPC ............. G06K 19/07722; G06K 19/02; G06K 19/07743; G06K 19/07749;
(Continued)

(56) References Cited

U.S. PATENT DOCUMENTS 9,390,366 B1* 7/2016 Herslow .......... G06K 19/07769
2013/0087622 A1* 4/2013 Collins ................ B42D 25/382
977/773
(Continued)

OTHER PUBLICATIONS

International Search Report and Written Opinion, dated Oct. 20, 2022, from PCT Application No. PCT/IB2022/056762, 8 pages.

Primary Examiner — Steven S Paik
Assistant Examiner — Asifa Habib

(57) ABSTRACT

The present invention relates to a dual interface smart card (100), comprising, a metal layer (101), a self-adhesive layer (102), a magnetic layer (103), a dual adhesive layer (104), an antenna (105), an antenna inlay layer (106), an overlay layer (108) with magnetic strip, a filler material (110), integrated circuit chip module (113), wherein, the metal layer (101) acts as a surface layer and the self-adhesive layer (102) creates a bond, the dual adhesive layer (104) bonds the magnetic layer (103) with the antenna inlay layer (106) and the overlay layer (108) with magnetic stripe is a protective layer for the printed layer (107) lay the magnetic stripe for swiping the dual interface smart card (100). The integrated circuit chip module (113) is embedded by using Te-connect process which comprises of solder paste to connect antenna (105) and module contact pads.

9 Claims, 15 Drawing Sheets

(58) Field of Classification Search
CPC .............. G06K 19/07769; B32B 9/041; B32B 37/1207; B32B 2309/12; B32B 2425/00
See application file for complete search history.

(56) References Cited

U.S. PATENT DOCUMENTS

| | | | |
|---|---|---|---|
| 2015/0115039 A1* | 4/2015 | Mosteller | B32B 37/18 235/488 |
| 2015/0269477 A1 | 9/2015 | Finn et al. | |
| 2018/0339503 A1* | 11/2018 | Finn | H01Q 1/2225 |
| 2020/0151534 A1* | 5/2020 | Lotya | G06K 19/07722 |
| 2020/0151535 A1* | 5/2020 | Herslow | G06K 19/07769 |
| 2021/0117744 A1* | 4/2021 | Finn | G06K 19/07769 |
| 2021/0256341 A1* | 8/2021 | Lotya | G06K 19/07718 |
| 2021/0350198 A1* | 11/2021 | Finn | G06K 19/07722 |
| 2022/0027702 A1* | 1/2022 | Kang | G06K 19/07747 |
| 2023/0334281 A1* | 10/2023 | Finn | G06K 19/07794 |
| 2024/0070425 A1* | 2/2024 | Lowe | G06Q 20/40145 |
| 2024/0242055 A1* | 7/2024 | Devadiga | G06K 19/07749 |

* cited by examiner

DUAL INTERFACE SMART CARD WITH METAL FACE LAYER AND MANUFACTURING METHOD THEREOF

CROSS REFERENCE TO RELATED APPLICATIONS

This application is a National Stage Entry filed under 35 U.S.C. 371 of PCT/IB2022/056762, filed Jul. 21, 2022, which claims priority to India Patent Application No. 202241000462, filed Jan. 4, 2022, all of which are assigned to the assignee hereof. The disclosures of all prior Applications are considered part of and are incorporated by reference in this Patent Application.

FIELD OF THE INVENTION

The present invention relates to a smart card with metal layer. More particularly, the present invention relates to a dual interface smart card with metal face layer and manufacturing method thereof with a dual interface chip module and an antenna for achieving higher output and reducing the complexity of manufacturing method by reducing the number of steps.

BACKGROUND OF THE INVENTION

In the last few years, the use of smart cards have escalated and it is used in almost all the industries such as in corporate industries in the form of secure identity applications in all the employee ID badges, citizen ID documents, electronic passports, driver's licenses and online authentication devices, in healthcare industries in the form of healthcare applications in all the citizen health ID cards, physician ID cards, portable medical records cards, in supermarkets, shopping stores and various eateries in the form of payment applications either through a contact or a contactless credit or debit cards and transit payment cards. Smart Cards, also play a vital role in various telecommunications applications in the form of GSM subscriber identity modules, telephone payment cards, which typically use static information for online uses. However, such static information is generally easy to hack and intercept.

Generally, a secure microcontroller or an identically intelligent microcontroller having an internal memory storage or an external memory storage in the form of a memory chip only, then such microcontroller, when embedded in the form of an integrated circuit chip is known as a smart card. Therefore, a smart card is generally available in the form of an embedded integrated circuit chip. A smart card has to be read using a smart card reader, therefore a smart card can be connected to a smart card reader both physically as well as virtually. Thus, a smart card can be connected to the smart card reader, physically by a direct physical contact or virtually through a remote contactless radio frequency interface.

The smart cards possess distinctive features such as the capability to store abundance of data, they can perform various functions related to encryption and mutual authentication on their own since they are embedded with a microcontroller, thus a smart card reader can interact intelligently. The technology used in the smart cards is in confirmation with the international standards, ISO/IEC 7816 and ISO/IEC 14443. Nowadays, it is easier to spot a smart card, as it is available in various different forms including a plastic card, generally seen to be used as a metro card or in offices to enter the office buildings, in the form of a SIM, which is a subscriber identity module, which can easily be spotted while using a GSM mobile phone, and in various financial institutions such as banks in the form of a USB-based token.

However, a lot of problems are faced while manufacturing of these metal smart cards such as high complexity, shrinkage and expansion of layers in the smart card during lamination phase, due to which the life of the smart card reduces. Moreover, currently the metal smart cards are manufactured through thermal soldering process which includes approximately 19 to 20 steps such as card input magazines, milling, card cleaning, vision system for wire position inspection, wire pulling left and right side, vision for wire position, milling cavity for module encapsulation, wire pulling and cleaning, wire straightening, wire trimming/dressing, module punch, pick and place, soldering (lead, tin) and alike. Due to more number of manufacturing steps, more amount of time and resource in consumed further due to Lamination of different material types such as Metal, PVC, Adhesive layer, the layers get shrink or expand which causes wastage and productivity loss during metal smartcard manufacturing.

US20040206799A1 discloses about a method and apparatus for soldering terminal ends of an antenna embedded in a plastic smart card to contact terminals of an IC module disposed on the card are shown. The enamel coated antenna terminal ends are pre-coated with solder with a heater having horizontal opening with melted solder retained therein. The solder pre-coated terminal ends are maintained in a secured contact with the terminal contacts of the IC module by heating coils mounted at a free front end of two pivotal elongated cantilever arms. A piece of predetermined amount of solder is dropped into the cavity of each heating coil, and the heating coils are actuated with a low electrical current to generate a concentrated intense heat to meld the piece of solder to form secure permanent solder joints between the terminal ends of the antenna to the contact terminals of the IC module. But this invention uses thermal soldering process which includes more number of steps, moreover, this invention limits to achieve higher throughput.

U.S. Pat. No. 6,881,605B2 discloses about a method of forming a card embedded with an integrated circuit (IC) and an antenna coil, which method including the steps of (a) embedding an antenna coil onto a core sheet; (b) laminating the core sheet with a number of outer sheets to form a laminated panel; (c) forming a first cavity in the laminated panel to expose part of the antenna coil; (d) pulling out two ends of the antenna coil from the core sheet; and (e) securing the integrated circuit with the antenna coil, e.g. by soldering or thermal compression bonding. But this invention uses thermal soldering process which includes more number of steps, further due to lamination process, the layers get shrink or expand which limits to achieve higher throughput.

US20150028106A1 discloses about a method of manufacturing a smart card embedded with an integrated circuit module and an antenna coil includes step (a), embedding an antenna coil on a core sheet, (b), laminating the core sheet with a number of outer sheets to form a laminated panel, (c), forming a cavity in the laminated panel to expose two ends of the antenna coil, and (d), connecting two electric contact regions of an integrated circuit module. The exposed ends of the antenna coil are connected by a mezzanine electrode diffusion welding method, controlled by a transformer output manipulation energy output control method. But this invention discloses about a manufacturing method that comprise of more number of steps that limits to achieve higher throughput.

Dual interface smart cards manufacturing methods are widely known in the public domain, but all the currently available manufacturing method comprise more number of steps, due to which more number of equipment and time is required. Additionally, upon the lamination step the layer shrinks or expanded, which leads to production of a poor quality of smart card and several issues arise while lamination of layers due to variations in the characteristics of layers.

Therefore, due to aforementioned drawbacks, there is a need to provide a metal smart card, which contributes significantly towards achieving higher output and a metal smart card, which reduces process during production by avoiding using any adhesive below filler material.

OBJECT OF THE INVENTION

The main object of the present invention is to provide a dual interface smart card with metal face layer and manufacturing method thereof that includes a two-step lamination process for avoiding unnecessary shrinkage and expansion of layers inside the smart card.

Another object of the present invention is to provide a dual interface smart card with metal face layer and manufacturing method thereof with a lamination plate having embossing that helps in maintaining pressure during lamination process.

Yet another object of the present invention is to provide a dual interface smart card with metal face layer and manufacturing method thereof that includes a Te-connect process which results in high throughput as compared to conventional process like thermal soldering process.

Yet another object of the present invention is to provide a dual interface smart card with metal face layer and manufacturing method thereof that aims to reduce the number of steps during manufacturing resulting in reduction in cost and complexity.

Still another object of the present invention is to provide a dual interface smart card with metal face layer and manufacturing method thereof with a capability to interface as contact as well as contactless with one more metal layers.

SUMMARY OF THE INVENTION

The present invention relates to a dual interface smart card with metal face layer and manufacturing method thereof that includes two-step lamination process for avoiding unnecessary shrinkage and expansion of layers inside the smart card and includes a Te-connect process which results in high throughput as compared to conventional process like thermal soldering process.

In an embodiment, the present invention provides a dual interface smart card, comprising of, a metal layer, a self-adhesive layer, a magnetic layer, a dual adhesive layer, an antenna, an antenna inlay layer, a printed layer, an overlay layer with magnetic strip, a filler material, a solder paste, a heat activated glue tape, integrated circuit chip module, wherein, the metal layer acts as a surface layer of the dual interface smart card and the self-adhesive layer creates a bond between the metal layer with the magnetic layer, the magnetic layer prevents the metal layer from interfering with an electromagnetic field that is generated from the antenna and the magnetic layer has high permeability with high resistance and placed between the metal layer and the antenna inlay layer for adjusting plurality of magnetic field lines of the electromagnetic field, the dual layer adhesive bonds the magnetic layer with the antenna inlay layer and the antenna inlay layer is a base material for holding the antenna for form an inlay, the printed layer is for printing an information for visual display, the overlay with magnetic stripe is a protective layer for the printed layer and acts a base material to lay the magnetic stripe for swiping the dual interface smart card, the filler material fills the metal layer and holds the integrated circuit chip module and acts as an insulating layer in the dual interface smart card and filler material bonds with a back layer without using any adhesive underneath said filler material.

In another embodiment, the present invention provides a method for manufacturing a dual interface smart card, comprises the steps of: a) preparing a metal layer, b) selecting a dual adhesive layer and a magnetic layer, c) preparing an antenna layer, d) preparing a plastic back layer, e) preparing a magnetic layer and an adhesive layer, f) collating said layer and layer to form an assembly of said dual interface smart card, g) laminating said assembly and preparing an integrated circuit chip module for implanting, and h) milling said metal card to implant said integrated circuit chip module which produces said dual interface smart card with metal face layer, wherein, said metal layer is processed for creating a pin hole through an automated tool, said dual adhesive layer and magnetic layer are collated together and a hole is created on said collated dual adhesive layer and magnetic layer, said antenna layer is prepared by embedding an antenna on a plastic layer and said antenna layer is flattened by a lamination process which forms an antenna inlay layer, said plastic back layer is printed with any information and plurality of magnetic strips are transferred on an overlay layer, said antenna inlay layer, plastic back layer and said overlay layer are spot welded together and laminated to create a laminated back layer for avoiding shrinkage and expansion of said layers and a pin hole is created on said laminated back layer, said metal layer, dual adhesive layer, said laminated back layer are collated and a filler material is applied through said hole created in said metal layer to form said assembly, said assembly is laminated to form a laminated metal card, said milling of said metal card to implant said integrated circuit chip module is done through a Te-connect process that helps to obtain higher throughput as compared to thermal soldering process.

In still another embodiment, the present invention provides a method for milling an integrated circuit chip module and implanting a cavity in a dual interface smart card, comprises steps of a) milling a card with filler layer for accommodating surface of the integrated circuit chip module till plurality of antenna terminals are exposed, b) selecting the integrated circuit chip module and applying a heat activated glue tape on the integrated circuit chip module for exposing plurality of connectors of the integrated circuit chip module, c) placing the integrated circuit chip module that is obtained from step (b) on a milled product obtained through step (a); and d) applying a solder past on the antenna terminals for embedding the integrated circuit chip module on the card.

The above objects and advantages of the present invention will become apparent from the hereinafter set forth brief description of the drawings, detailed description of the invention, and claims appended herewith.

BRIEF DESCRIPTION OF THE DRAWING

An understanding of the dual interface smart card with metal face layer and manufacturing method of the present invention may be obtained by reference to the following drawings.

DETAILED DESCRIPTION OF THE INVENTION

Figure 1A:
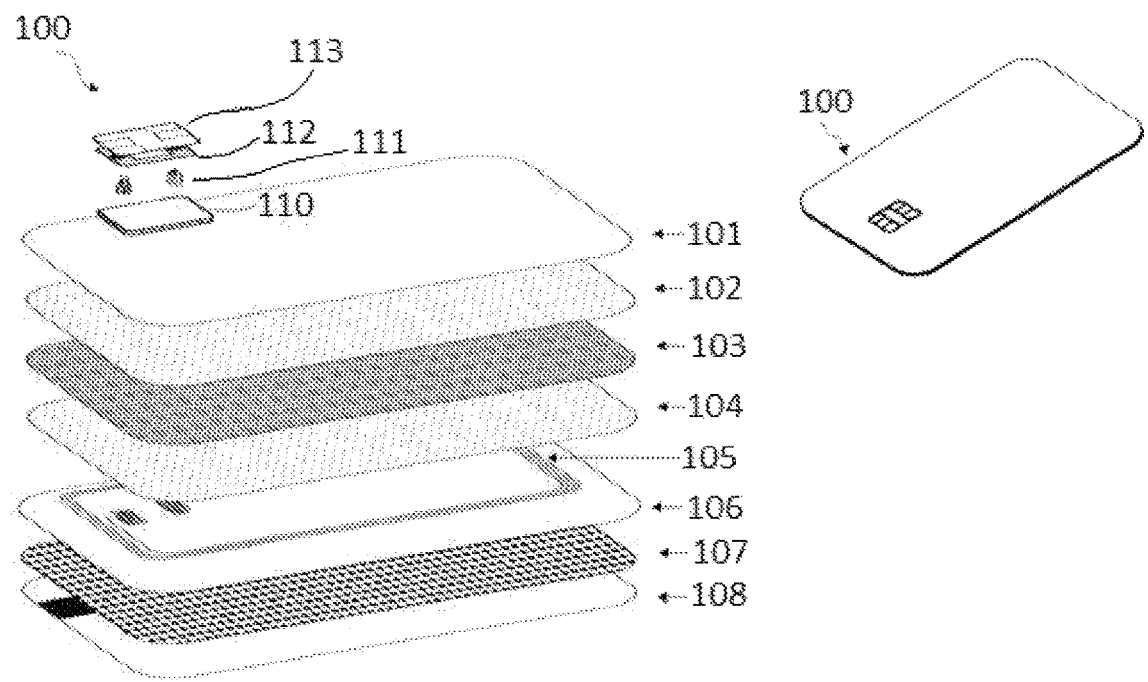
FIG. 1(a) is an exploded view of the dual interface smart card with metal face layer according to an embodiment of the present invention.

The present invention will now be described hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

The present invention provides a dual interface smart card with metal face layer and manufacturing method thereof that aims to reduce the number of steps during manufacturing resulting in reduction in cost and complexity.

In an embodiment, the present invention provides a dual interface smart card, comprising of, a metal layer, a self-adhesive layer, a magnetic layer, a dual adhesive layer, an antenna, an antenna inlay layer, a printed layer, an overlay layer with magnetic strip, a filler material, a solder paste, a heat activated glue tape, integrated circuit chip module, wherein, the metal layer acts as a surface layer of the dual interface smart card and the self-adhesive layer creates a bond between the metal layer with the magnetic layer, the magnetic layer prevents the metal layer from interfering with an electromagnetic field that is generated from the antenna and the magnetic layer has high permeability with high resistance and placed between the metal layer and the antenna inlay layer for adjusting plurality of magnetic field lines of the electromagnetic field, the dual layer adhesive bonds the magnetic layer with the antenna inlay layer and the antenna inlay layer is a base material for holding the antenna for form an inlay, the printed layer is for printing an information for visual display, the overlay with magnetic stripe is a protective layer for the printed layer and acts a base material to lay the magnetic stripe for swiping the dual interface smart card, the filler material fills the metal layer and holds the integrated circuit chip module and acts as an insulating layer in the dual interface smart card.

Referring to FIG. 1(a), an exploded view of a dual interface smart card with metal face layer is depicted. The dual interface smart card (100) comprising of, a metal layer (101), a self-adhesive layer (102), a magnetic layer, a dual adhesive layer (104), an antenna (105), an antenna inlay layer (106), a printed layer, an overlay layer with magnetic strip, a filler material (110), a solder paste (111), a heat activated glue tape (112), integrated circuit chip module (113).

Figure 1B:
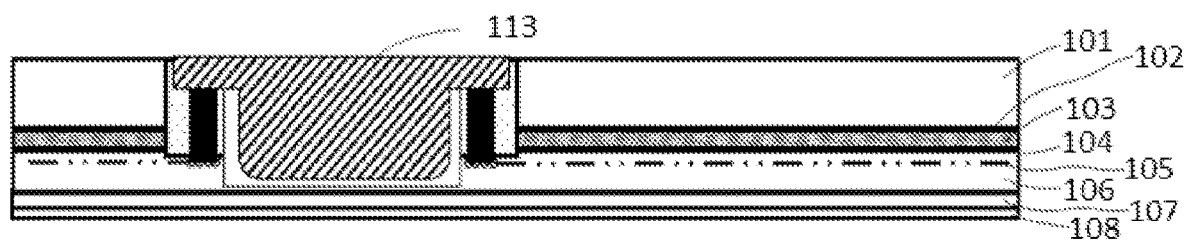
FIG. 1(b) is a side view of the dual interface smart card with metal face layer according to an embodiment of the present invention.

Referring to FIG. 1(b), a side view of the dual interface smart card with metal face layer is depicted. The dual interface smart card (100) has thickness ranging from 800 to 810 micron with integrated circuit chip module that is embedded on the metal layer (101).

Figure 2:
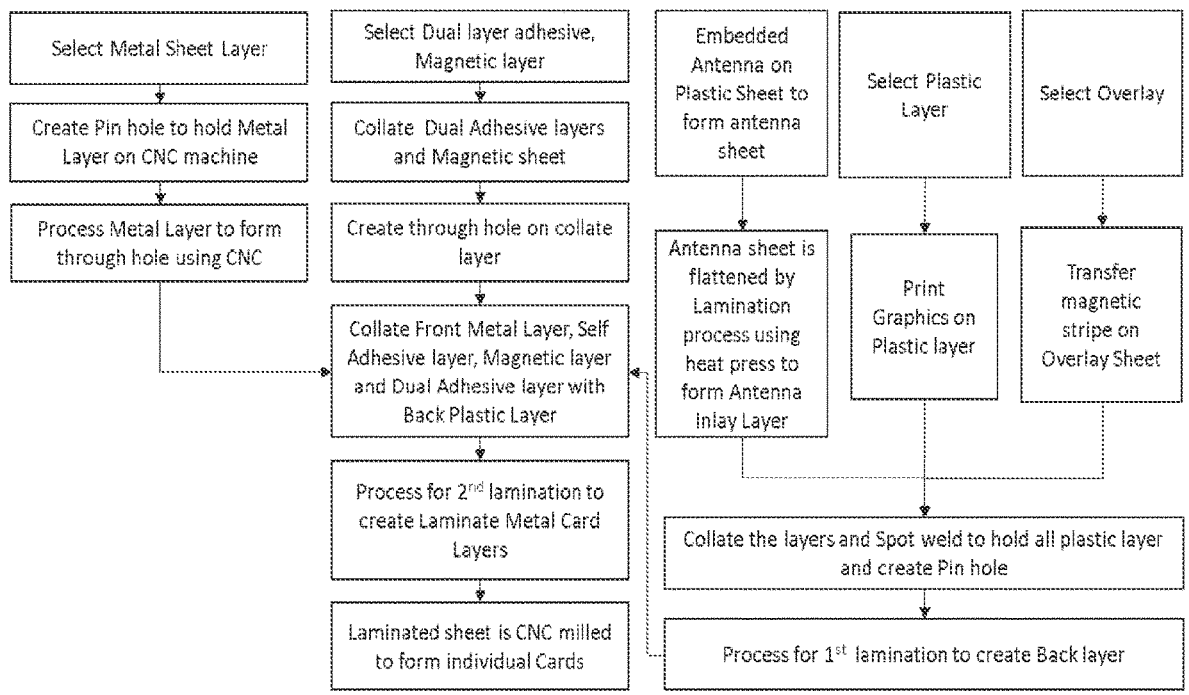
FIG. 2 is a flow chart of manufacturing method of dual interface smart card with metal face layer according to an embodiment of the present invention.

Referring to FIG. 2, a flow chart of manufacturing method of dual interface smart card with metal face layer is depicted. The method for manufacturing a dual interface smart card (100) with metal face layer, comprises the steps of, a) preparing a metal layer (101), b) selecting a dual adhesive layer (104) and a magnetic layer, c) preparing an antenna layer, d) preparing a plastic back layer, e) preparing a magnetic layer and an adhesive layer, f) collating said layer and layer to form an assembly of said dual interface smart card (100), g) laminating said assembly and preparing an integrated circuit chip module for implanting, and h) milling said metal card to implant said integrated circuit chip module which produces said dual interface smart card (100) with metal face layer, wherein, said metal layer (101) is processed for creating a pin hole through an automated tool, said dual adhesive layer (104) and magnetic layer are collated together and a hole is created on said collated dual adhesive layer (104) and magnetic layer, said antenna layer is prepared by embedding an antenna (105) on a plastic layer and said antenna layer is flattened by a lamination process which forms an antenna inlay layer (106), said plastic back layer is printed with any information and plurality of magnetic strips are transferred on an overlay layer (108), said antenna inlay layer (106), plastic back layer and said overlay layer (108) are spot welded together and laminated to create a laminated back layer for avoiding shrinkage and expansion of said layers and a pin hole is created on said laminated back layer, said metal layer (101), dual adhesive layer (104), said laminated back layer are collated and a filler material (110) is applied through said hole created in said metal layer (101) to form said assembly, said assembly is laminated to form a laminated metal card, said milling of said metal card to implant said integrated circuit chip module is done through a Te-connect process that helps to obtain higher throughput as compared to thermal soldering process.

Figure 3A:
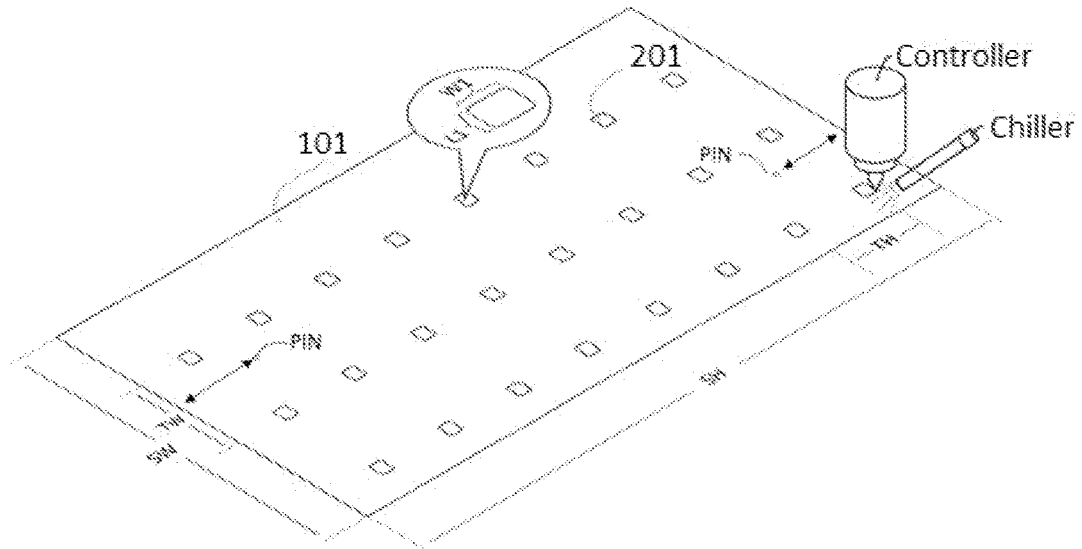
FIG. 3(a) and FIG. 3(b) are a perspective and side views of a hole in the metal layer according to an embodiment of the present invention.
Figure 3B:
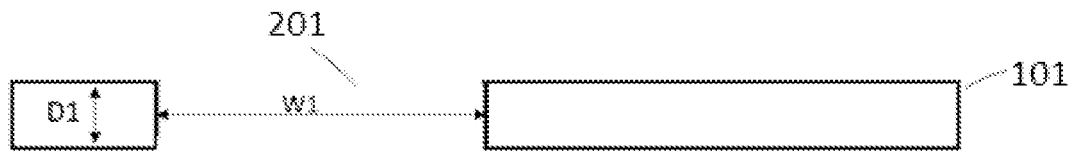

Referring to FIG. 3(a) and FIG. 3(b), a perspective and side views of a hole in the metal layer of the present invention is depicted. The metal layer (101) is selected in sheet format which is heat treated to improve strength and tension and intended to serve as the top layer of a card which is 300 series grade (specifically 304/316) stainless steel combined with other alloys with thickness ranging from 380 to 400 microns. The metal layer (101) is then processed to form a through hole in known manner including, but no limited to: milling, laser cutting etc. The dimension of the through hole is set higher than the dimension of the integrated circuit chip module used to form the card. The advantage of making larger through hole then dimension of integrated circuit chip module is to provide greater separation between the metal layer (101) and the integrated circuit chip module and thus enhance transmission. The through hole may be of square, a rectangle or a circle in shape based on the integrated circuit chip module selected.

The metal layer (101) has width (SH) in range from 450 to 485 mm and height (SW) in range from 250 to 300 mm. The thickness (D1) of the sheet is in range from 390 to 400 micron as shown in FIG. 3(b). This metal layer (101) is first milled to obtain two pin hole of size in range from 2 to 3 mm in diameter which are located 68 to 71.56 mm away from the top of layer and bottom edge. These pins help to hold the material firm during milling process. The metal layer (101) is then placed on the CNC (Computer Numerical Control) milling machine to create through hole (201) on metal layer (101) with width (W1) and length (L1) being at least 0.8 mm higher than the integrated circuit chip module dimensions. As illustrated in FIG. 3(a) about 20 to 24 through holes (201) are created in the metal layer (101) with vertical distance between these through holes (TH) is in range from 50 to 56.98 and horizontal distance (TW) is in range from 85 to 91 mm.

Figure 4A:
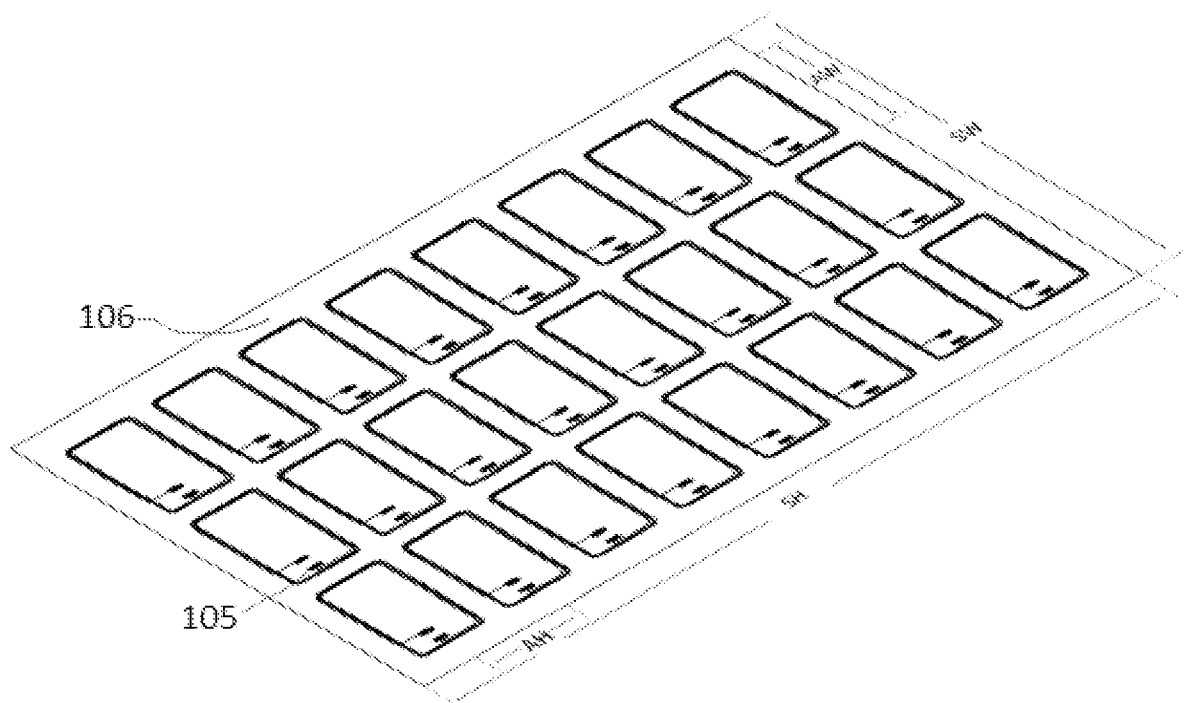
FIG. 4(a) and FIG. 4(b), top and side views of the antenna in the dual interface smart card according to an embodiment of the present invention.
Figure 4B:
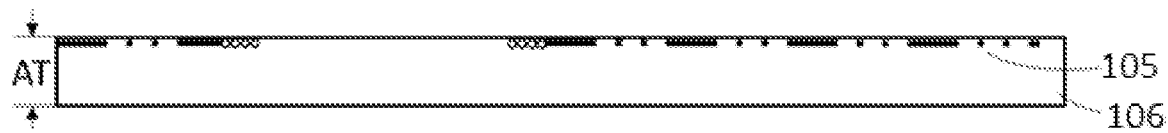

Referring to FIG. 4(a) and FIG. 4(b), top and side views of the antenna in the present invention is depicted. The antenna (105) is embedded into the antenna inlay layer (106) by using copper wire antenna embedding machine. The antenna inlay layer material is held using vacuum and magnetic guide on wire embedding machine so to ensure the antenna sheet stays firm using antenna embedding process. The antenna (105) is designed to resonate at 13.56 mhz. the antenna designs are recommended by integrated circuit chip module as depicted in FIG. 4(a).

The antenna inlay layer (106) is processed for antenna flattening process by applying heat, cold and pressure using standard lamination machine. Lamination process is carried out by applying a pressure in range from 700 to 800 psi in multiple steps at hot temperature of 152° C. for about 10 to 12 minutes and by then cooling the sheets at 20 to 25° C. and by applying pressure of 1200 to 1500 psi for 12 to 14 minutes again at multiple steps to form laminated antenna inlay layer (106) having thickness (AT) of 150 microns as depicted in FIG. 4(b).

Figure 5A:
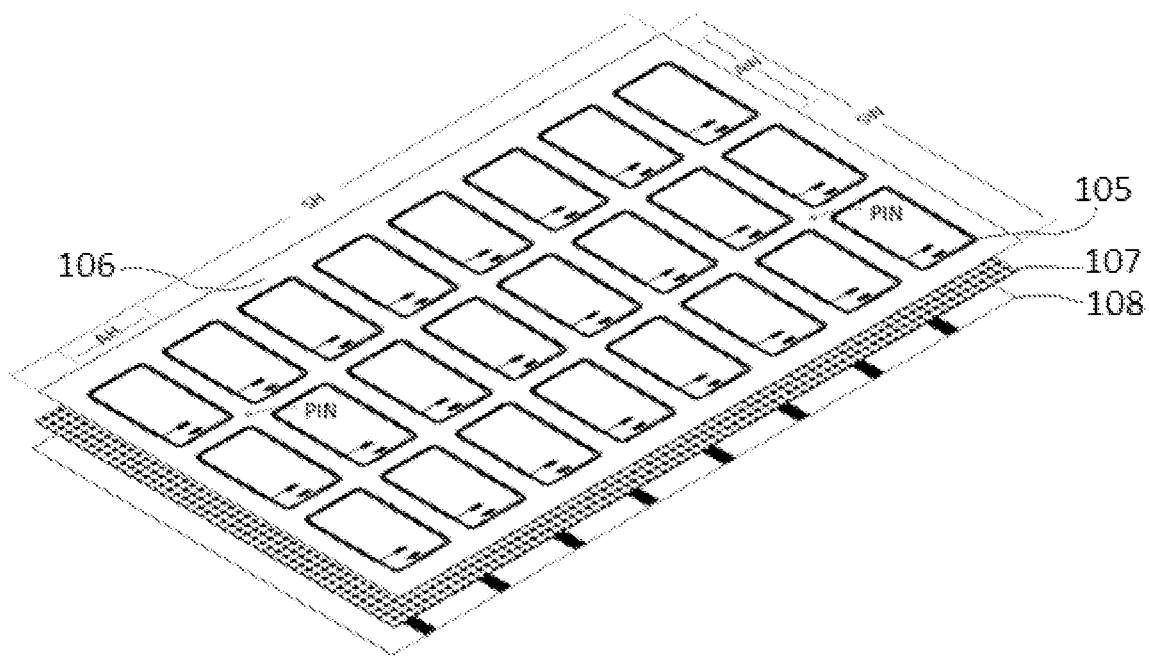
FIG. 5(a) is top views of antennal inlay layer in the dual interface smart card with metal face layer collated with layers such as printed sheet and overlay to form back layer according to an embodiment of the present invention.

Referring to FIG. 5(a), a top view of antennal inlay layer is depicted. The antenna inlay layer (106) along with printed layer (107) and overlay with magnetic stripe (108) are collated, spot welded to ensure all plastic materials are held intact. The spot welded sheets are then created with pin hole of 2 to 3 mm diameter and processed for lamination using standard lamination process to form a first assembly. The position of the pin hole is matched with the pin hole created in the metal layer (101).

Figure 5B:
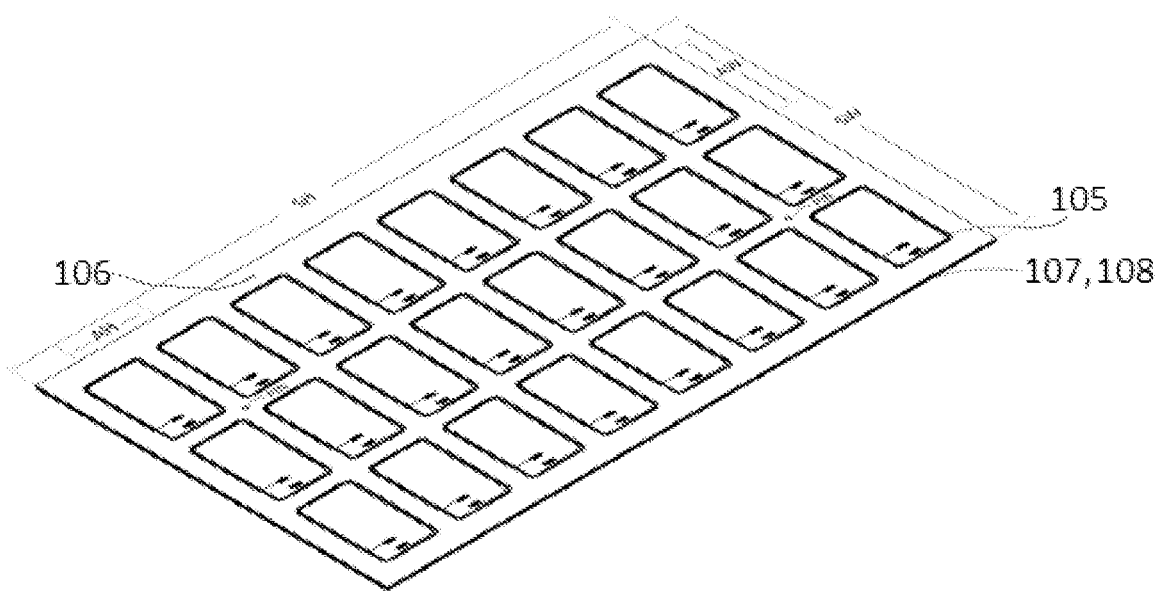
FIG. 5(b) is the top view of the card after first lamination according to an embodiment of the present invention.
Figure 5C:
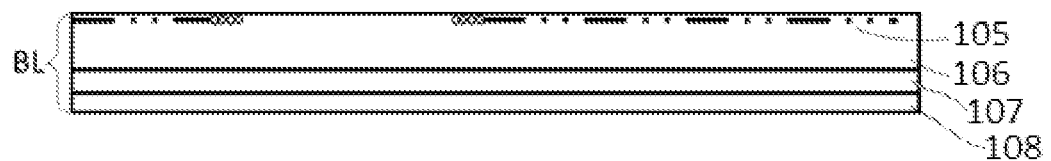
FIG. 5(c) is a side view of the card after first lamination according to an embodiment of the present invention.

Referring to FIG. 5(b), another top view of antennal inlay layer after being welded and laminated. The first step lamination process is carried out by applying a pressure ranging from 700 to 800 psi at hot temperature that lies in range from 150 to 152° ° C. for about 12 to 16 minutes and by then cooling the layer at temperature ranging from 20 to 25° C. and by applying pressure of 1200 to 1500 psi for 12 to 16 minutes. The side view of the card after first lamination is depicted in FIG. 5(c).

Figure 6A:
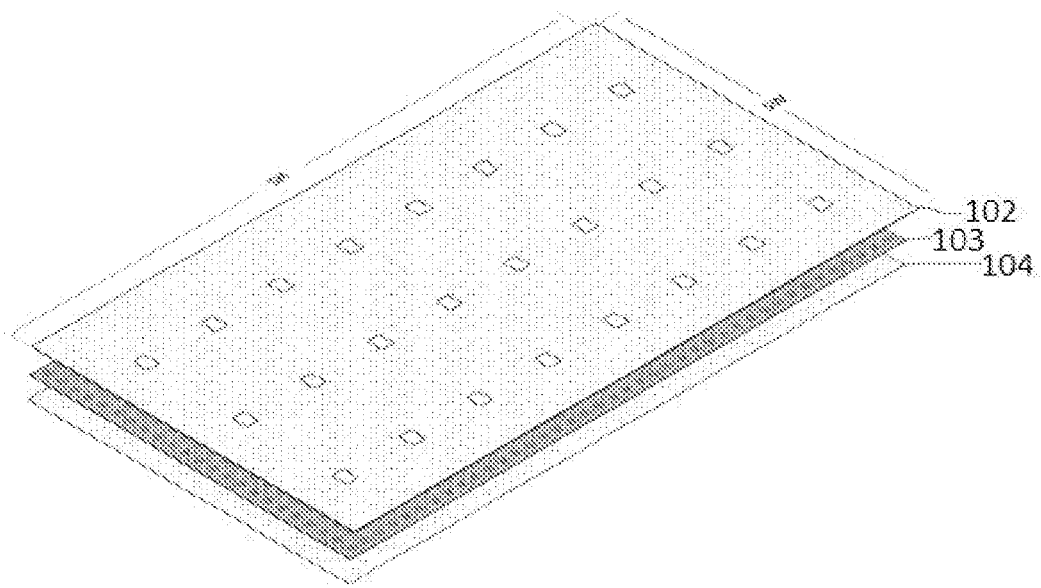
FIG. 6(a) and FIG. 6(b) are top view and side view of through hole punched in the area for adhesive layer in the dual interface smart card with metal face layer according to an embodiment of the present invention.

Referring to FIG. 6(a), a top view of through hole punched in the area for adhesive layer in the present invention is depicted. The Error! Reference source not found. layer (104) is used to bond metal layer (101) with magnetic layer (103) and with antenna inlay layer (106). The magnetic layer (103) serves to shield/prevent/reduce metal layer (101) from interfering with an electromagnetic field that occur when the antenna (105) operates through communication with an external antenna reader. The magnetic field generated from antenna (105) interacts with the metal layer (101), and self-resonant frequency of the antenna is changed so that the inductance of the antenna (105) is lowered to cause communication troubles, which is because of eddy current generated from metal layer (101) by mean of magnetic field. To eliminate this, the magnetic layer (103) having high permeability and high resistance is located between metal layer (101) and inlay layer to adjust the magnetic field lines.

Figure 6B:
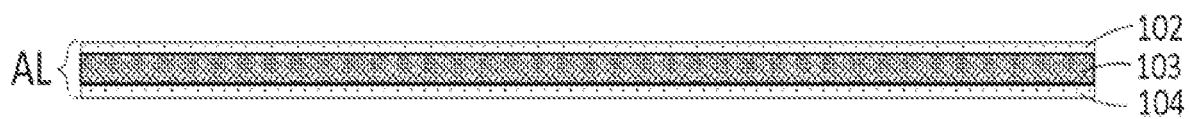

Referring to FIG. 6(b), a side view of the magnetic sheet that is sandwiched with the adhesive layer is depicted. The magnetic layer (103) is sandwiched with adhesive layer in the form of film (102 and 104) are all collated to form one layer (AL). The size of this layer is same as that of the metal sheet layer. This layer is then punched using sheet punching machine to create a through hole to match with the metal layer (101) through hole.

Figure 7A:
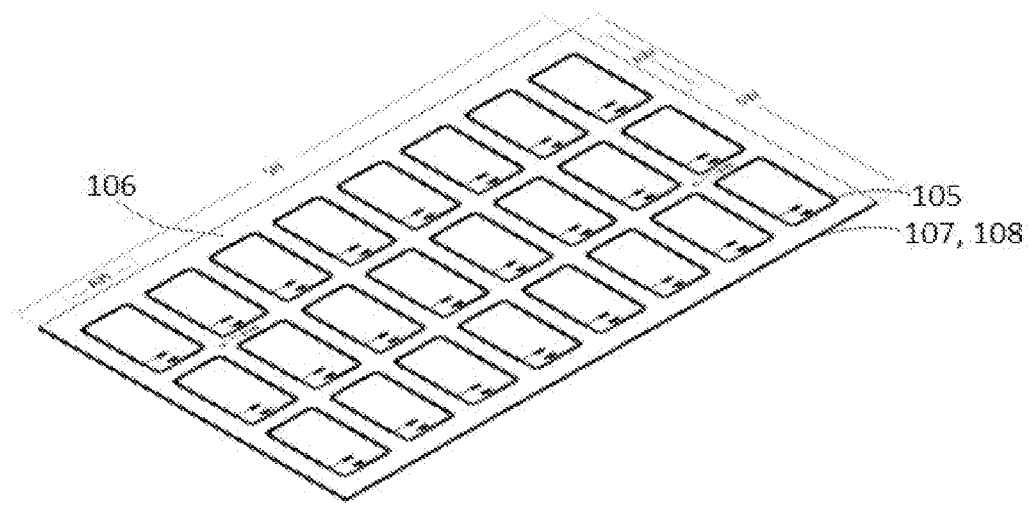
FIG. 7(a) and FIG. 7(b) are top views of a laminated back layer in dual interface smart card with metal face layer according to an embodiment of the present invention.
Figure 7B:
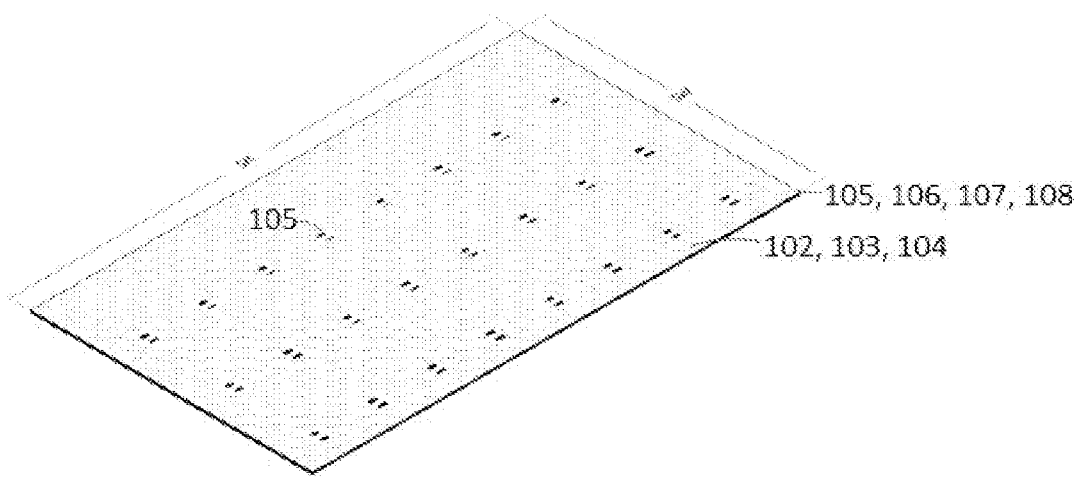

Referring to FIG. 7(a), a top view of a laminated back layer in dual interface smart card is depicted. The laminated back layer used herein comprise of the antenna (105), antenna inlay layer (106), printed layer (107) and overlay layer (108) with magnetic stripe that collated together. Referring to FIG. 7(b), another top view of the laminated back layer with placement of magnetic and adhesive layers is depicted. The adhesive layer with magnetic layer (103) is collated and placed on the laminated back layer.

Figure 7C:
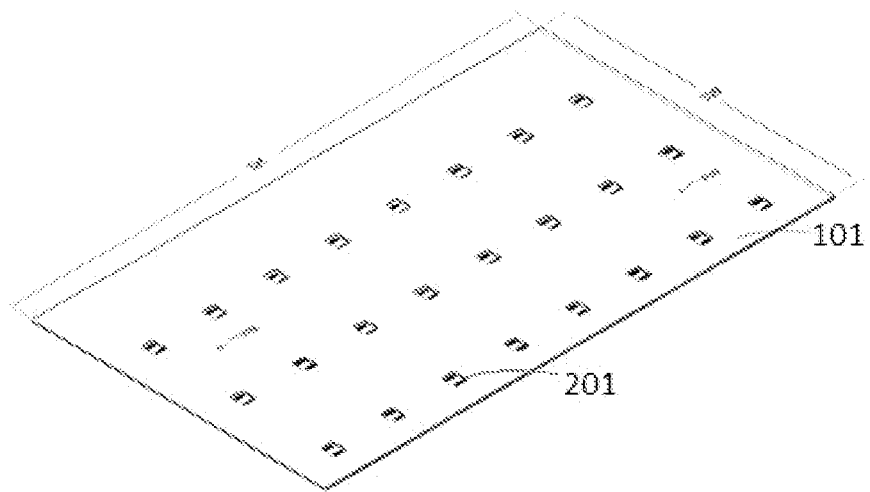
FIG. 7(c) is a top view of the adhesive layer is depicted over which the metal layer is placed in dual interface smart card with metal face layer according to an embodiment of the present invention.
Figure 7D:
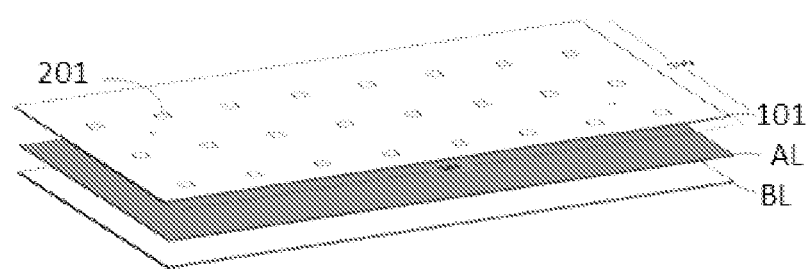
FIG. 7(d) is a perspective view of the collated metal layer, adhesive layer and laminated back layer in dual interface smart card with metal face layer according to an embodiment of the present invention.
Figure 7E:
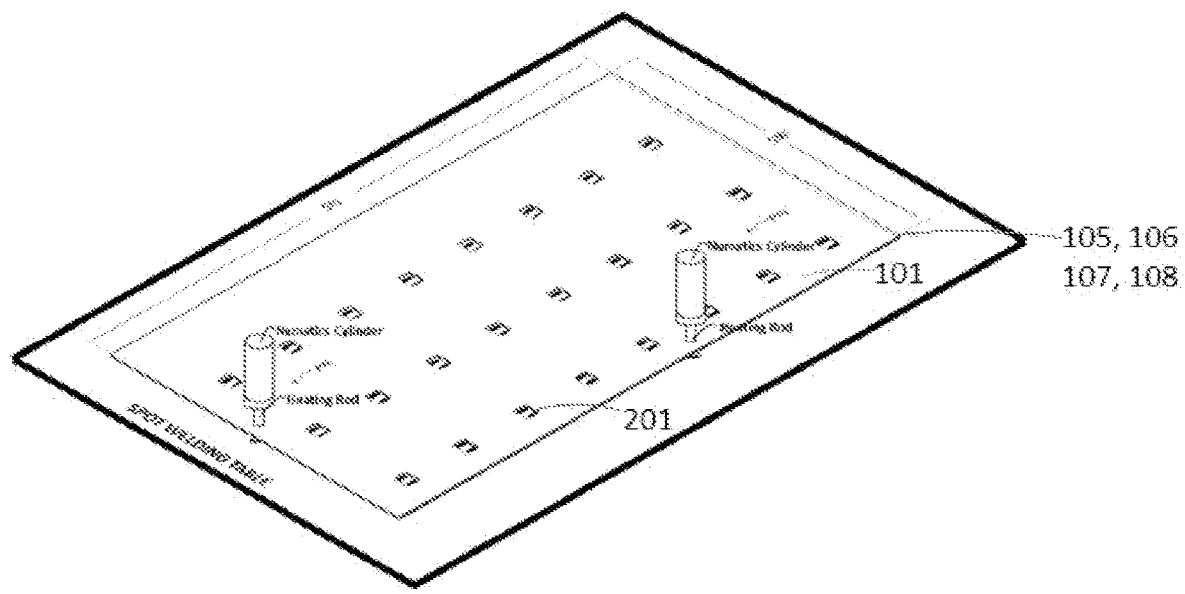
FIG. 7(e) is a diagrammatic view of spot welding all layers in dual interface smart card with metal face layer according to an embodiment of the present invention.
Figure 7F:
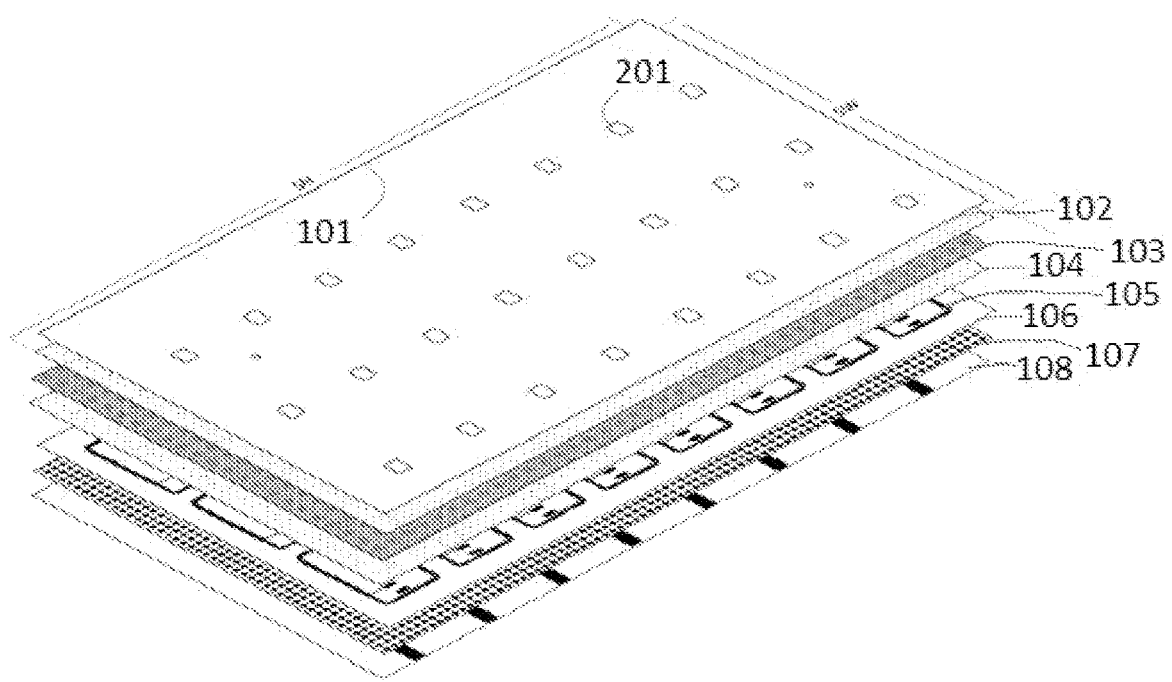
FIG. 7(f) is an exploded view of all the layers in dual interface smart card with metal face layer according to an embodiment of the present invention.

Referring to FIG. 7(c), top view of the adhesive layer is depicted over which the metal layer is placed. The metal layer (101) having through hole is placed on the adhesive layer and collated. Referring to FIG. 7(d), a perspective view of the collated metal layer (101), adhesive layer and laminated back layer is depicted. The metal layer (101), magnetic layer (103) sandwiched with adhesive layer (AL) and back layer (BL) are collated and spot-welded using spot welding table. Referring to FIG. 7(e) is a diagrammatic view of spot welding all layers and FIG. 7(f), is an exploded view of all the layers. The table includes heating rod and numatics cylinder helps to apply pressure and heat on a specific spot which melts and holds all layers temporally to form one single sheet having thickness of 820 microns and processed for next process.

Figure 8A:
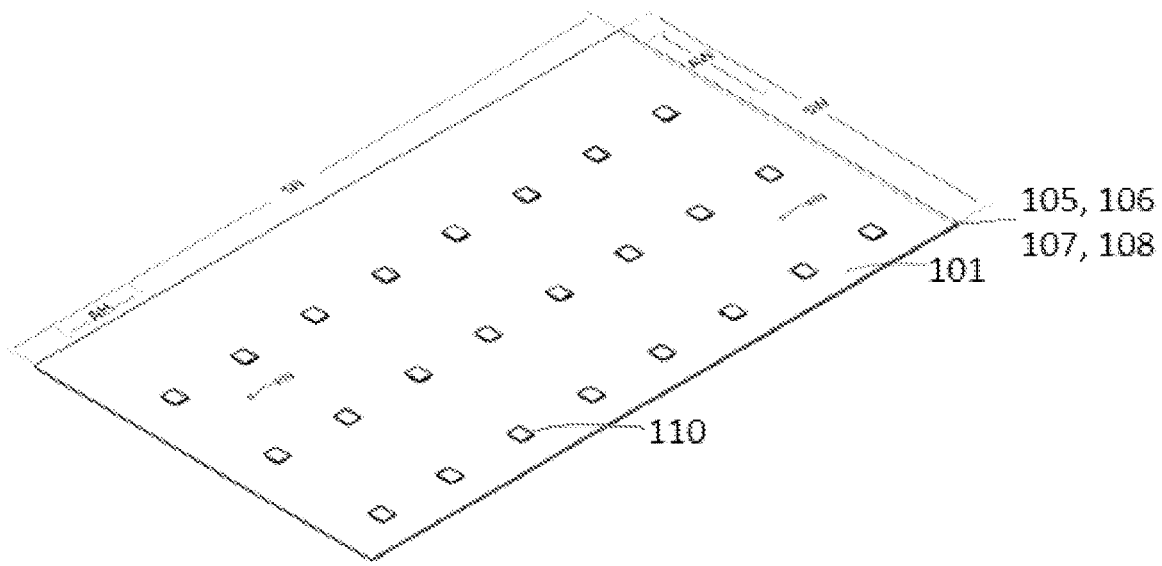
FIG. 8(a) is a diagrammatic view of placement of filler material on the metal layer through the hole in dual interface smart card with metal face layer according to an embodiment of the present invention.
Figure 8B:
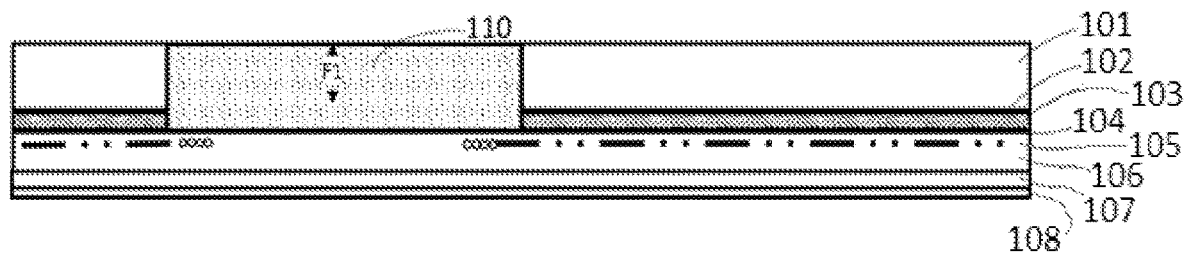
FIG. 8(b) is another exploded view of filler layers in the dual interface smart card layer according to an embodiment of the present invention.

Referring to FIG. 8 (a), a diagrammatic view of placement of filler material on the metal layer through the hole is depicted. The collated and spot-welded assembly containing the metal layer (101) with through hole, is then inserted with a filler material (110) which does not interfere with transmission. The filler material (110) is placed ensuring that the interior walls of the through hole (201) and or the exterior walls of the filler material (110) adheres firmly to the walls of the through hole (201). Referring to FIG. 8 (b), another exploded view of filler layers in the dual interface smart card (100). The filler material (110) is inserted with thickness (F1), 20 microns lesser than the metal layer (101). The width and height of the filler material (110) is same as that of through hole (201) dimensions on metal layer (101) and processed for second lamination process. The filler material (110) bonds with a back layer without using any adhesive underneath said filler material (110).

Figure 9A:
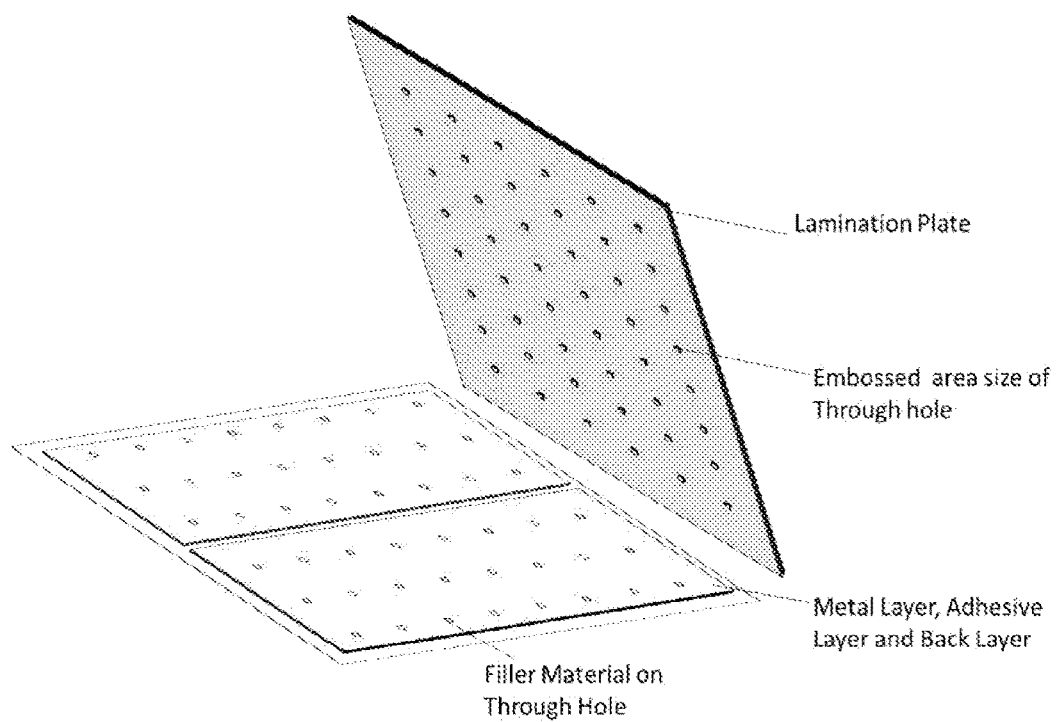
FIG. 9(a) is an isometric view of a lamination plate with embossed layer in the dual interface smart card layer according to an embodiment of the present invention.
Figure 9B:
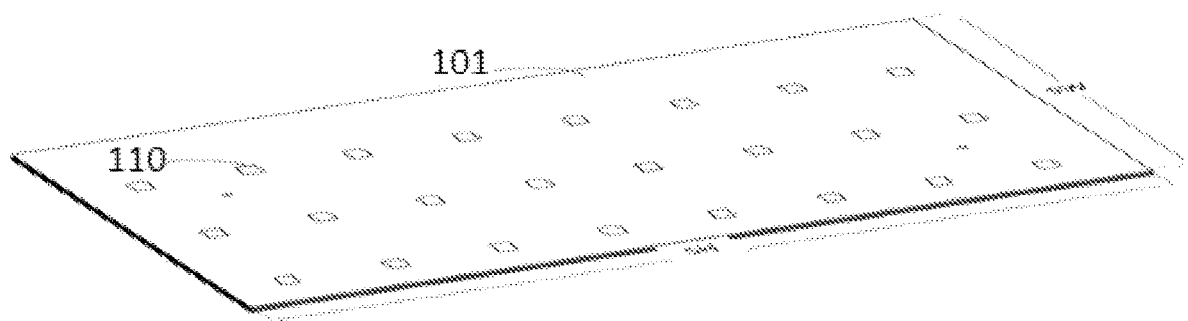
FIG. 9(b) is a perspective view of lamination plate with metal top surface and plastic back surface in the dual interface smart card layer according to an embodiment of the present invention.
Figure 9C:
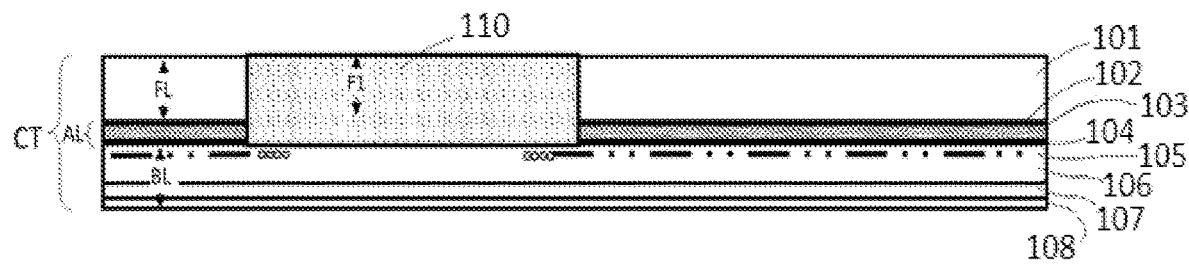
FIG. 9(c) is an expanded view of all layers in the dual interface smart card layer according to an embodiment of the present invention.

Referring to FIG. 9(a), an isometric view of a lamination plate with embossed layer is depicted. The second step lamination process is carried out using lamination plate having embossed/raised layer on plate to ensure pressure is evenly applied on filler material (110) during lamination process. The thickness of the embossed layer is preferably not greater than 20 microns. Referring to FIG. 9(b), a perspective view of lamination plate with metal top surface and plastic back surface. Second step lamination process is carried out by applying a pressure of 500 to 700 psi at hot temperature of 175° C. for about 18 minutes and then cooling the layers at 25° C. by applying pressure of 900 to 1000 psi for 18 minutes. The total thickness of after lamination (CT) is approx. is 800 to 810 microns. The exploded view of all layers in the card is depicted in FIG. 9(c).

Figure 10A:
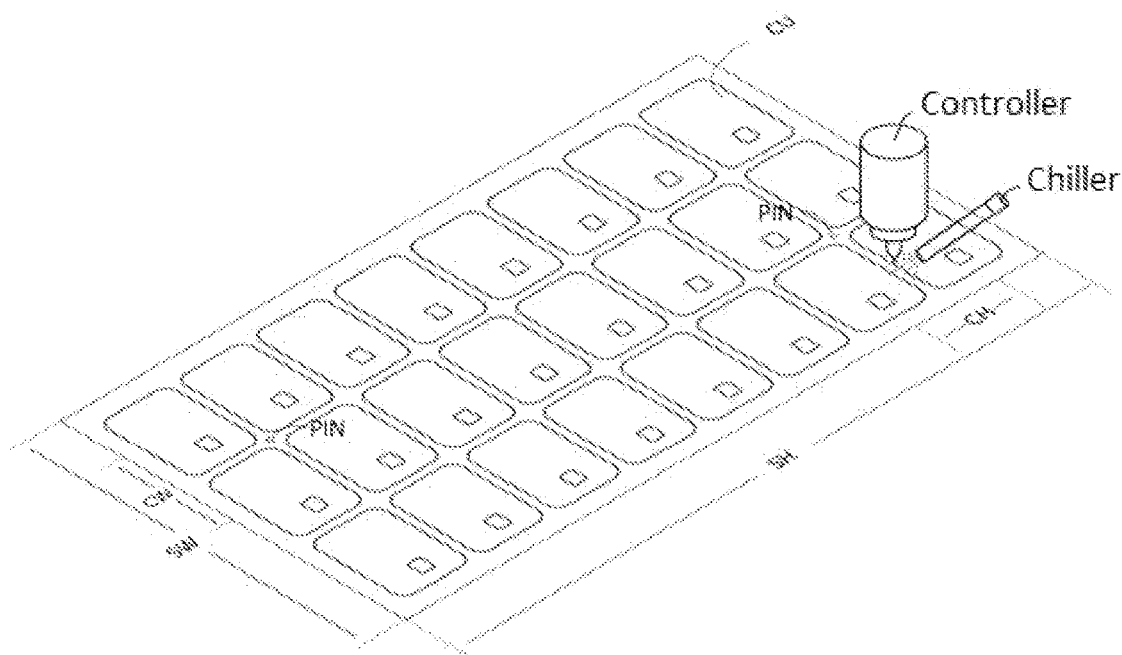
FIG. 10(a) and FIG. 10(b) are top views of the laminated plate that is CNC milled to form the dual interface smart card layer and dimension of the dual interface smart card layer according to an embodiment of the present invention.
Figure 10B:
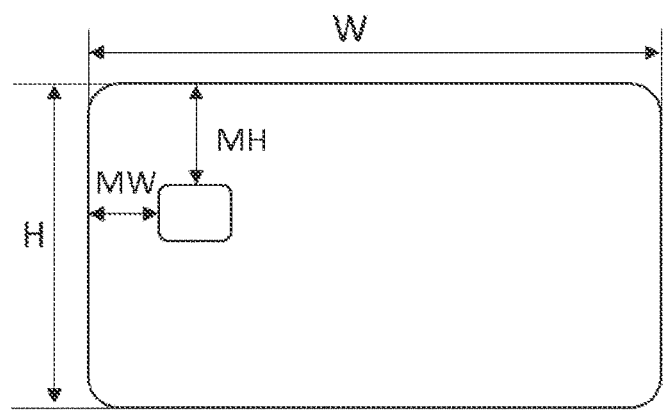

Referring to FIG. 10(a), is a top view of the laminated plate that is CNC milled to form the card. The laminated plate having thickness of 800-810 micron is then processed through CNC milling to create individual card (CU) which contains through hole on metal surface (101) layer. The vertical distance (CH) 55.48 mm between the card and horizontal distance (CW) between the card is 91 mm. having plate size of (SH) 485 mm and (SW) 300 mm. Referring to FIG. 10(b), a front view of the dual interface card after CNC milled step is depicted. The dimension of the individual card is as illustrated in the FIG. 10(b) with Width (W) of the card being 85.6 mm and height (H) of the card being 53.98 mm in size. The position of the through hole is located from top edge of the card (MH) 18.5 mm and (MW) is 9.5 mm from side edge of the card.

Figure 11:
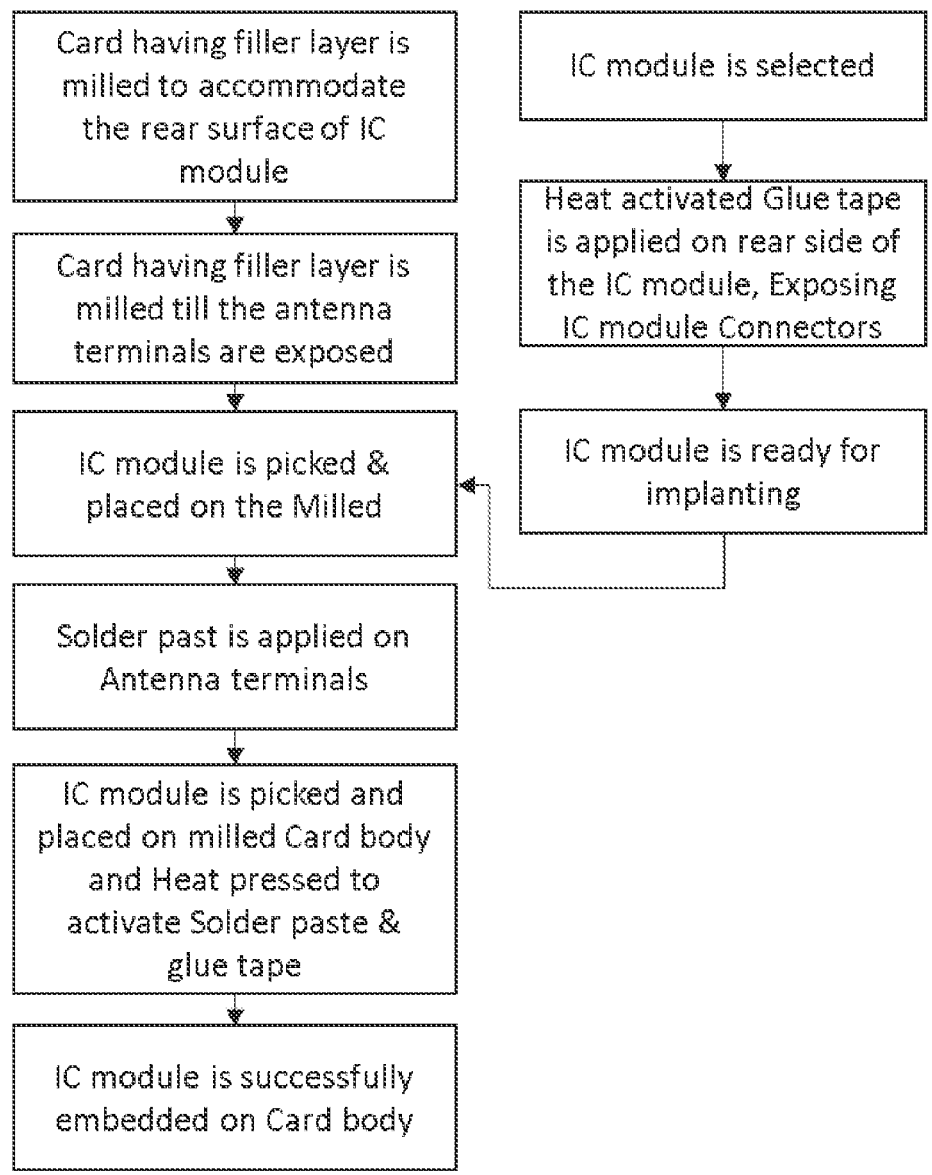
FIG. 11 is a flow chart of method for milling an integrated circuit chip module and implanting a cavity in the dual interface smart card according to an embodiment of the present invention.

Referring to FIG. 11, a flow chart of method for milling an integrated circuit chip module and implanting a cavity in a dual interface smart card is depicted. The method for milling an integrated circuit chip module (113) and implanting a cavity in a dual interface smart card (100), comprises steps of a) milling a card with filler layer for accommodating surface of the integrated circuit chip module (113) till plurality of antenna (105) terminals are exposed, b) selecting the integrated circuit chip module (113) and applying a heat activated glue tape (112) on the integrated circuit chip module (113) for exposing plurality of connectors of the integrated circuit chip module (113), c) placing the integrated circuit chip module (113) that is obtained from step (b) on a milled product obtained through step (a); and d) applying a solder past on the antenna (105) terminals for embedding the integrated circuit chip module on the card.

Figure 12A:
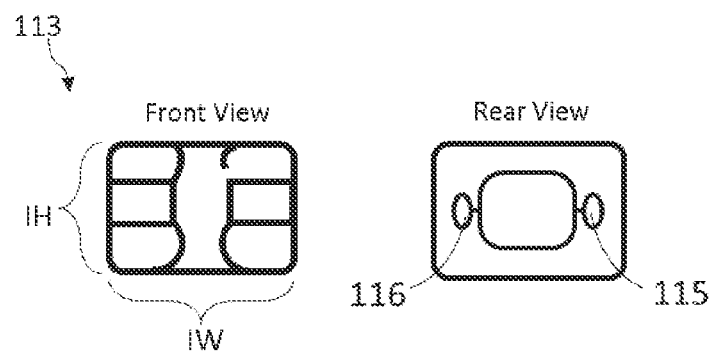
FIG. 12(a) is a front and top view of integrated circuit chip module of the dual interface smart card according to an embodiment of the present invention.

Referring to FIG. 12(a), a front and top view of integrated circuit chip module is depicted. The integrated circuit chip module (113) having dual interface connector (115 and 116) option on rear side of the integrated circuit chip module to connect to antenna layer (105) to enable dual interface function is selected. The integrated circuit chip module modules used herein are in different shapes, sizes, PIN configuration. However, the preferable dimensions of the integrated circuit chip module (IW) is 11 mm and height (IH) is 8.5 mm.

Figure 12B:
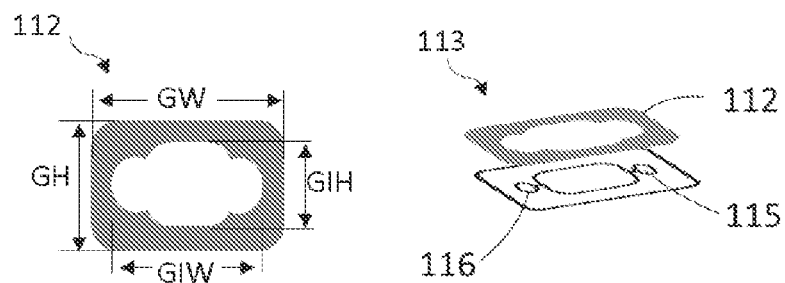
FIG. 12(b) is a diagrammatic view of the heat activated glue tap that is applied on the integrated circuit chip module of the dual interface smart card according to an embodiment of the present invention.

Referring to FIG. 12(b), a diagrammatic view of the heat activated glue tap that is applied on the integrated circuit chip module is depicted. The integrated circuit chip module (113) is processed through glue tape lamination machine where heat activated tape (112) is die cut and transferred onto the rear side of the integrated circuit chip module. The shape of glue tape (112) is formed as per integrated circuit chip module dimension. The glue tape (112) is die cut to a shape to ensure that the glue tape is not transferred on to the connectors (115 and 116) and left open with approximate dimension of height (GIH) 6.6 mm and width (GIW) 8.2 mm. The dimension of the applied glue tape having width (GW) 11 mm and height (GH) 8.5 mm is as per the integrated circuit chip module (113) size selected.

Figure 12C:
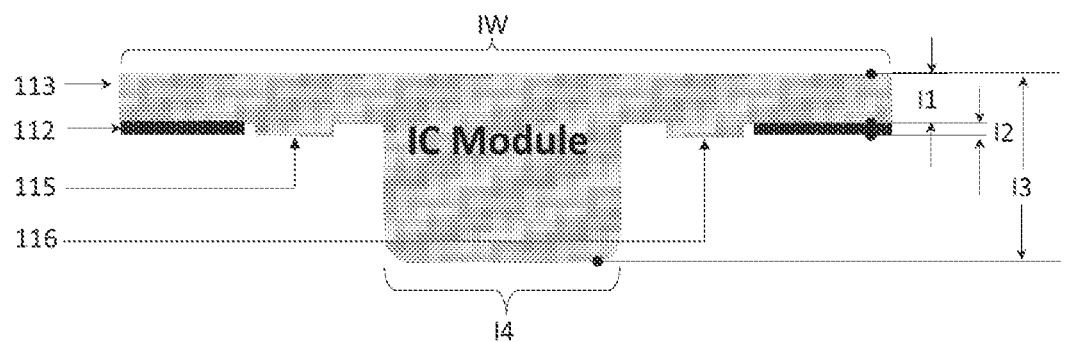
FIG. 12(c) is a schematic view of the integrated circuit chip module of the dual interface smart card according to an embodiment of the present invention.

Referring to FIG. 12(c), a schematic view of the integrated circuit chip module is depicted. The overall thickness (I3) of the integrated circuit chip module (113) is approx. 580 micron and thickness of integrated circuit chip module tape is (I1) is approximately 220 microns and the thickness (I2) of glue tape (112) is approx. 45-50 micron. The bottom width of integrated circuit chip module (14) is smaller than the width of (GIW).

Figure 13A:
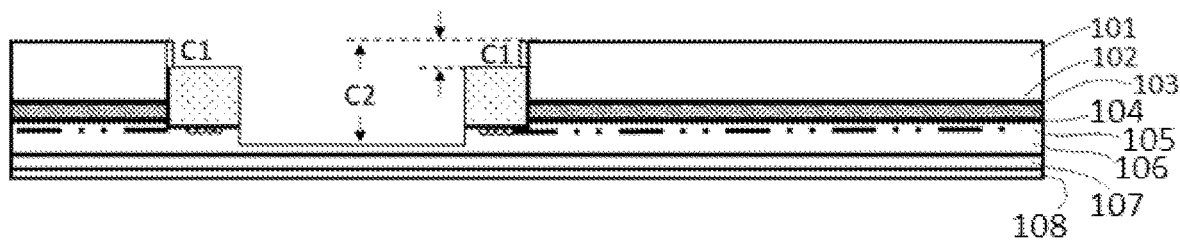
FIG. 13(a) is a side view of the first and second cavity milling in the dual interface card according to an embodiment of the present invention.

Referring to FIG. 13(a), a side view of the first and second cavity milling in the dual interface card is depicted. The integrated circuit chip module (113) milling and implanting process is carried out using automated milling and embedding machine using the technology named Te-Connect. In this process card body is milled to accommodate integrated circuit chip module (113) shape, size and connector pads are connected to antenna terminals using solder paste. The transferred glue tape on rear side of the integrated circuit chip module (113) and dispensed solder paste on (C3) milled cavity are activated by applying heat and pressure followed by cooling and pressure on integrated circuit chip module. The metal card containing filler material (110) is processed for milling to accommodate integrated circuit chip module on the body of the dual interface card. The cavity is formed through the filler material (110) to a depth (C1) 240-260 microns from the top surface to accommodate integrated circuit chip module and glue tape (11 and 12) thickness. Since the width of (C1) is lesser than the through hole (201), This helps to create insulation layer (IL) between metal edge surface and integrated circuit chip module edges. The second cavity (C2) is milled at least 20 microns higher than integrated circuit chip module thickness (I3) and width of cavity (C2) is created at least 1 mm higher than the bottom width of integrated circuit chip module (14).

Figure 13B:
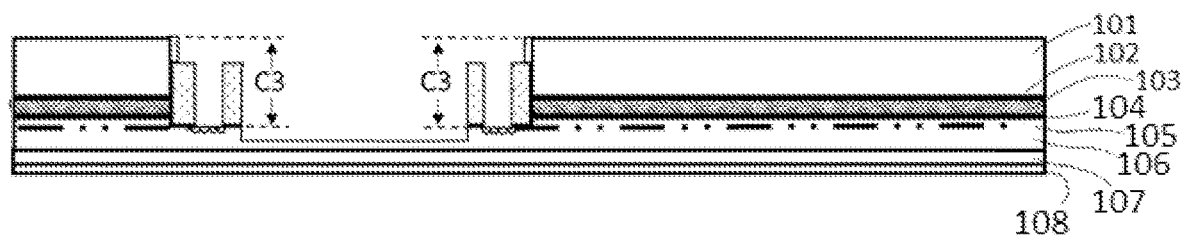
FIG. 13(b), a side view of the third and fourth cavity milling in the dual interface card according to an embodiment of the present invention.

Referring to FIG. 13(b), a side view of the third and fourth cavity milling in the dual interface card is depicted. The body of the dual interface card is then milled (C3) to the depth till antenna terminals are exposed approx. 580-590 micron. The (C3) is milled in circular shape (C3D) having diameter of 1.5 mm.

Figure 13C:
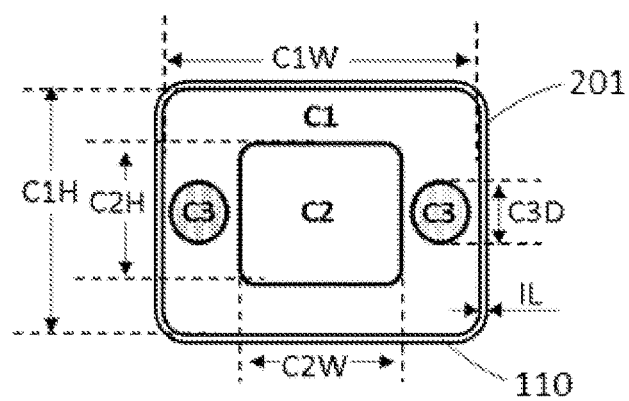
FIG. 13(c) is a diagrammatic view of milling shape and dimensions on filler material as per integrated circuit chip module in the dual interface card according to an embodiment of the present invention.

Referring to FIG. 13(c), a diagrammatic view of milling shape and dimensions on filler material (110) as per integrated circuit chip module (113). The milled C3 is filled with solder paste (111) which is conductive in nature and is heat treated to solidify and bond. The solder paste (111) is applied just before implanting the integrated circuit chip module (113), which helps to connect antenna (105) terminals with integrated circuit chip module connectors (115 and 116).

Figure 13D:
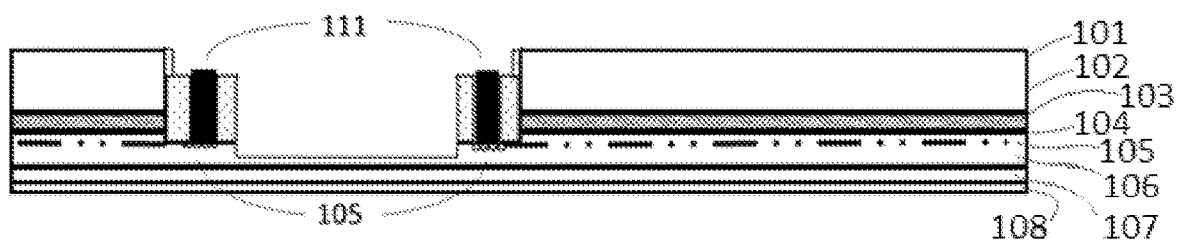
FIG. 13(d) is a side view of the dual interface card depicting the dispensing of solder paste into the cavity in the dual interface card according to an embodiment of the present invention.
Figure 13E:
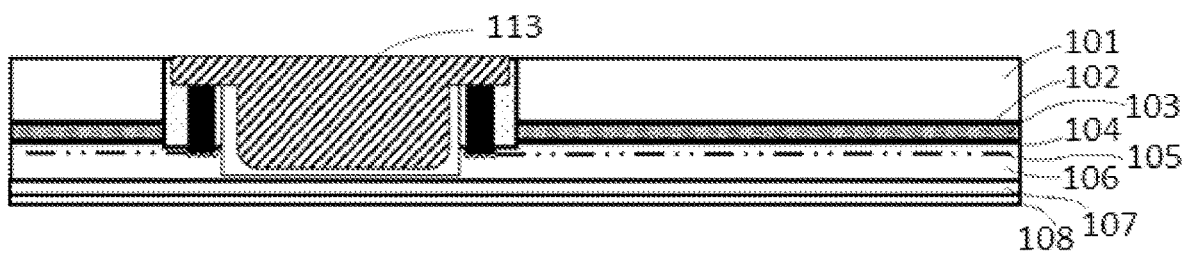
FIG. 13(e) is a diagrammatic view of embedding of integrated circuit chip module on the card surface according to an embodiment of the present invention.

Referring to FIG. 13(d), a side view of the dual interface card depicting the dispensing of solder paste (111) into the cavity. The integrated circuit chip module (113) is implanted into the milled section of card body and ascertained that the integrated circuit chip module is leveled to the top surface of the card body. Referring to FIG. 13(e), another side view of the dual interface card is depicted that shows the embedding of the integrated circuit chip module into the surface of the card. The implanting process is carried out with adequate pressure and heat on top surface of integrated circuit chip module. The glue tape (112) on integrated circuit chip module and solder paste (111) filled on (C3) is activated by heat and pressure. The integrated circuit chip module is then gradually cooled down with lower temperature and pressure. Referring to FIG. 13(e), a diagrammatic view of embedding of integrated circuit chip module on the card surface is depicted. The integrated circuit chip module is ensured that it is 10 microns above the card surface so to enable top surface of the integrated circuit chip module comes in contact with contact reader (Ex: POS, ATM). The integrated circuit chip module also enables contactless reading (on POS, ATM) as it is now enabled with the same.

Figure 14:
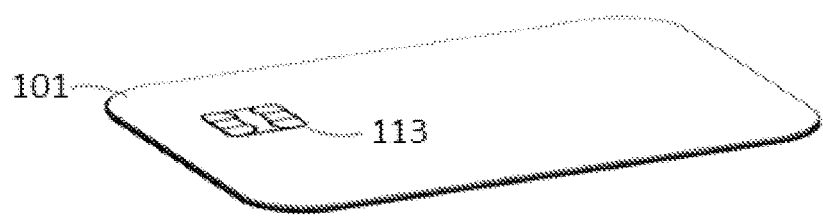
FIG. 14 is a perspective view of the dual interface smart card as a final product according to an embodiment of the present invention.

Referring to FIG. 14, a perspective view of the dual interface smart card is depicted, in which the two-step lamination process helps to avoid shrinkage and expansion of layers when laminating with other type of substrates. The first lamination is processed by laminating all plastic layers such as antenna inlay layer (106), printed sheet and overlay layer (108) with magnetic stripe and in second lamination process. The metal layer (101) with adhesive and magnetic sheet along with filler material is laminated together to form single assembly. Furthermore, the lamination plate having embossing/raise effect on through hole area helps to maintain even pressure during lamination process. The filler material strongly bonds with back layer without using any adhesive underneath the filler material. The through hole is created on metal surface and filler material is placed which provides support and creates insulation between integrated circuit chip module is and metal layer (101), cavity is created on filler material to implant the integrated circuit chip module is using Te-Connect enabled machine. The Te-Connect Process helps in obtaining higher throughput compared to thermal soldering process. The major advantage of the present invention is the reducing number of steps in process of manufacturing metal surface cards.

Example 1

Experimental Data Analysis

The present invention provides a dual interface smart card, which contributes significantly towards achieving higher output and a smart card, which reduces process during production by avoiding using any adhesive below filler material. The throughput details of the chip embedding machine followed in conventional and present invention are depicted in Table 1.

TABLE 1

Throughput details of the chip embedding machines

| Process | Speed (CPH: cards per hour) |
|---|---|
| Soldering Process followed in conventional methods | 1,500 CPH |
| Te-Connect followed in present invention | 2,200 CPH |

Figure 15:
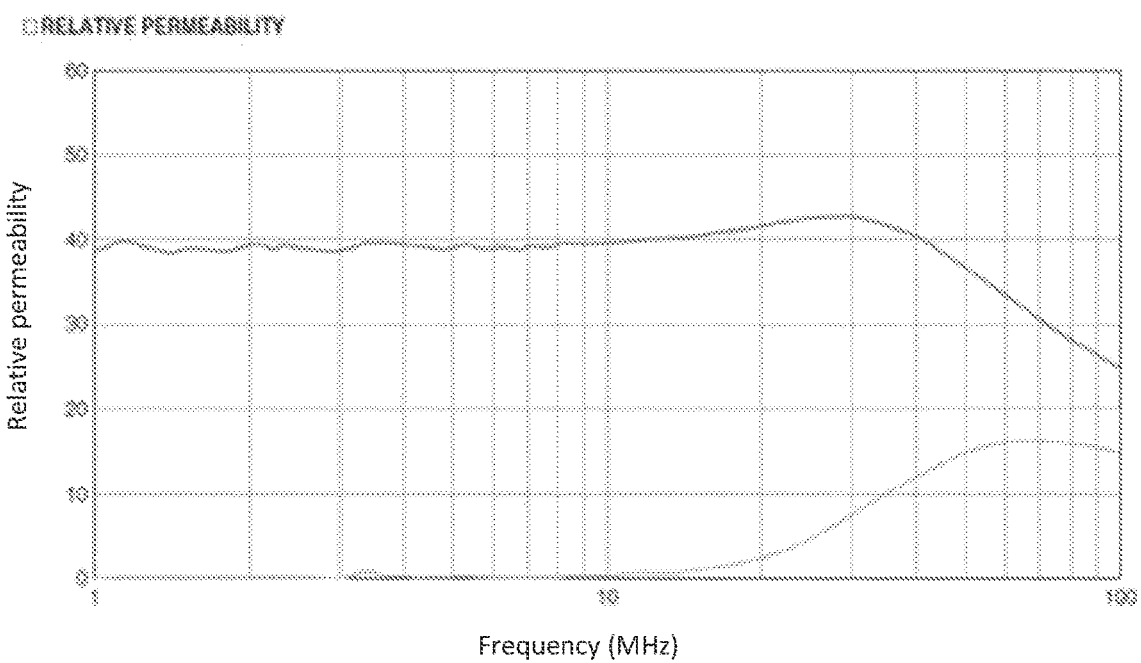
FIG. 15 is a graphical representation of relative permeability of the magnetic layer used in the dual interface smart card.

The magnetic layer prevents the metal layer from interfering with an electromagnetic field that is generated from the antenna and the magnetic layer has high permeability with high resistance and placed between the metal layer and the antenna inlay layer for adjusting plurality of magnetic field lines of the electromagnetic field. Table 2 and FIG. 15 presents data related to high permeability with high resistance of metal in the dual interface smart card.

TABLE 2

Data related to high permeability with high resistance of metal in the dual interface smart card

| | Material Name | | | | | | | |
|---|---|---|---|---|---|---|---|---|
| | Relative Permeability [at 13.56 MHz] | | | Surface Resistivity (Ohm/sq.) | Thermal Conductivity | Saturated magnetic Flux density | Curie Temperature | Relative Permittivity (at 1 MHz) | Operating temperature |
| | u' | u" | u'/u" | typ. | (W/m · K) | (mT) | (° C.) | typ. | (° C.) |
| Material used in present invention | 40 | 0.8 | 50 | 10M | 1.5 | 100 [H = 1194 A/m] | >500 | 1450 | −40 to +85 |

For calculating the resistance for the area of metal in the dual interface smart card, the equation (1) is used, wherein "R" refers to resistance.

$$R = p^*L/W, \quad (1)$$

$$L/w = 86/54 - 1.59 \text{ (Approx.)}, \quad p = 10 M\Omega,$$

$$\text{Hence } R = 15.9 M\Omega$$

Therefore, the present invention provides a metal smart card, which contributes significantly towards achieving higher output and a metal smart card, which reduces process during production by avoiding using any adhesive below filler material.

Many modifications and other embodiments of the invention set forth herein will readily occur to one skilled in the art to which the invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A dual interface smart card, comprising:
a metal layer;
a self-adhesive layer;
a magnetic layer;
a dual adhesive layer;
an antenna;
an antenna inlay layer;
a printed layer;
an overlay layer with a magnetic strip;
a filler material;
a solder paste;
a heat activated glue tape; and
integrated circuit chip module, wherein,
said metal layer acts as a surface layer of said dual interface smart card and said self-adhesive layer creates a bond between said metal layer with said magnetic layer;
said magnetic layer prevents said metal layer from interfering with an electromagnetic field that is generated from said antenna and said magnetic layer has high permeability with high resistance and placed between said metal layer and said antenna inlay layer for adjusting plurality of magnetic field lines of said electromagnetic field;
said magnetic layer has thickness in range from 45 to 55 micron magnetic layer and exhibits resistance ranging from 15 to 17 MΩ, permeability ranging from 45 to 65 u';
said dual adhesive layer bonds said magnetic layer with said antenna inlay layer and said antenna inlay layer is a base material for holding said antenna to form an inlay;
said printed layer is for printing an information for visual display;
said overlay layer with said magnetic strip is a protective layer for said printed layer and acts a base material to lay said magnetic stripe for swiping said dual interface smart card; and
said filler material fills said metal layer and holds said integrated circuit chip module and acts as an insulating layer in said dual interface smart card and filler material bonds with a back layer without using any adhesive underneath said filler material.

2. The dual interface smart card of claim 1, wherein said metal layer is made of a material including stainless steel sheet, or aluminium sheet.

3. The dual interface smart card of claim 1, wherein said self-adhesive layer and said dual adhesive layer are made of a heat activated material including thermoplastic.

4. The dual interface smart card of claim 1, wherein said antenna is made of a including copper coil.

5. The dual interface smart card of claim 1, wherein said heat activated glue tape is an adhesive film that is transferred on rear side of said integrated circuit chip module.

6. The dual interface smart card of claim 1, wherein said integrated circuit chip module comprise of an antenna pad and said integrated circuit chip module stores data.

7. A method for manufacturing a dual interface smart card, comprises the steps of:
a) preparing a metal layer;
b) selecting a dual adhesive layer and a magnetic layer, said magnetic layer has thickness in range from 45 to 55 micron magnetic layer and exhibits resistance ranging from 15 to 17 MΩ, permeability ranging from 45 to 65 u';

c) preparing an antenna inlay layer;
d) preparing a plastic back layer;
e) preparing said magnetic layer and an adhesive layer;
f) collating said layer and layer to form an assembly of said dual interface smart card;
g) laminating said assembly and preparing an integrated circuit chip module for implanting; and
h) milling said metal card to implant said integrated circuit chip module which produces said dual interface smart card with metal face layer, wherein, said metal layer is processed for creating a pin hole through an automated tool;

said dual adhesive layer and magnetic layer are collated together and a hole is created on said collated dual adhesive layer and magnetic layer;

said antenna inlay layer is prepared by embedding an antenna layer on a plastic layer and said antenna inlay layer is flattened by a lamination process which forms an antenna inlay layer;

said plastic back layer is printed with any information which forms a printed layer and plurality of magnetic strips are transferred on an overlay layer;

said antenna inlay layer, plastic back layer and said overlay layer are spot welded together and laminated to create a laminated back layer for avoiding shrinkage and expansion of said layers and a pin hole is created on said laminated back layer;

said metal layer, dual adhesive layer, said laminated back layer are collated and a filler material is applied through said hole created in said metal layer to form said assembly said assembly is laminated to form a laminated metal card; and said milling of said metal card to implant said integrated circuit chip module is done through a milling and implanting process that helps to obtain higher throughput as compared to thermal soldering process.

8. The method for manufacturing a dual interface smart card of claim 7, wherein said lamination process is carried out by applying a pressure in range from 700 to 800 psi at hot temperature ranging from 150 to 152° C. for 10 to 12 minutes and by then cooling at 20 to 25° C. and by applying pressure of 1200 to 1500 psi for 12 to 14 minutes again to form said antenna inlay layer.

9. The method of claim 7, wherein milling an integrated circuit chip module and implanting a cavity in a dual interface smart card, comprises steps of:

a) milling a card with filler layer for accommodating surface of said integrated circuit chip module till plurality of antenna terminals are exposed;

b) selecting said integrated circuit chip module and applying a heat activated glue tape on said integrated circuit chip module for exposing plurality of connectors of said integrated circuit chip module;

c) placing said integrated circuit chip module that is obtained from step (b) on a milled product obtained through step (a); and d) applying a solder paste on said antenna terminals for embedding said integrated circuit chip module on said dual interface smart card.

* * * * *